Aug. 5, 1969 W. J. BURKE 3,458,975
FILM DISPENSING APPARATUS FOR WRAPPING GLASSES
Filed Oct. 10, 1966
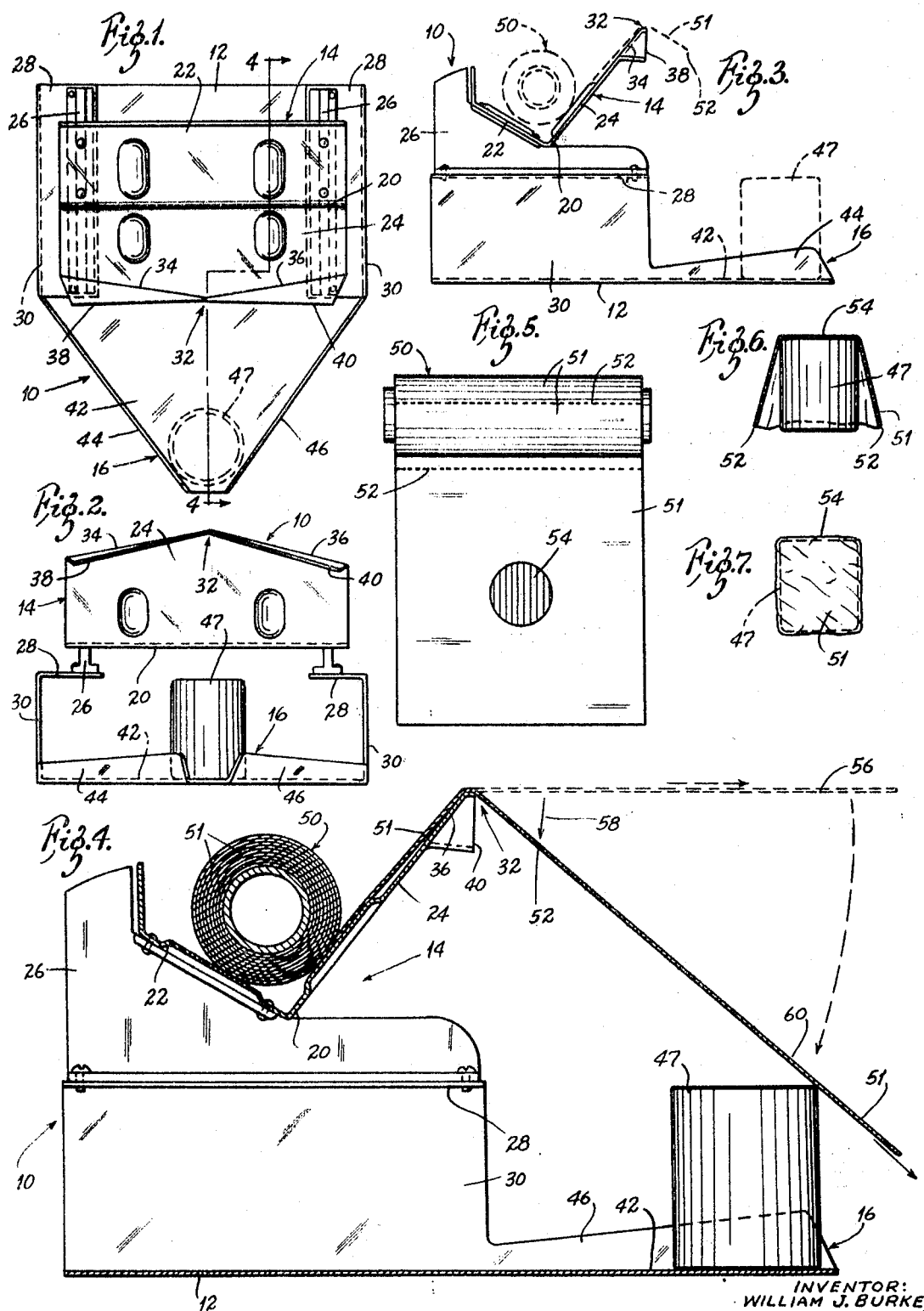
INVENTOR:
WILLIAM J. BURKE,
BY Kingsland, Rogers, Ezell, Eilers + Robbins
ATTORNEYS

United States Patent Office 3,458,975
Patented Aug. 5, 1969

3,458,975
FILM DISPENSING APPARATUS FOR
WRAPPING GLASSES
William J. Burke, Ladue, Mo., assignor to Roll-O-Sheets,
Inc., St. Louis, Mo., a corporation of Missouri
Filed Oct. 10, 1966, Ser. No. 585,520
Int. Cl. B65b 11/02, 45/00; B26f 3/02
U.S. Cl. 53—219      1 Claim

ABSTRACT OF THE DISCLOSURE

An apparatus for dispensing sheets of plastic film to glasses to be wrapped. The dispenser is provided with a dispenser trough receiving a roll of film and having a piercing means to separate the web into the sheets. The trough is supported above a work base having guide means to set apart a glass centering and positioning area to receive sheets of film with indicia at standard intervals to provide a means for registering the sheet upon the glass to be wrapped.

---

In the past it has been a problem in hotels, motels and various institutions to provide glasses that are clean. One means for providing a sanitary glass has been the practice of wrapping a glass in a bag or the like, which in some cases is sealed to provide a sanitary, wrapped glass which insures cleanliness until it is used. A glass may also be wrapped with the film being dispensed from a dispenser of rolled material in sheet form, such as that shown in our Patent No. 3,045,883, granted July 24, 1962. It has, however, been a problem to provide a swift and efficient means for wrapping glasses with film that can be simply employed and with apparatus that is not bulky and cumbersome or expensive.

It is accordingly an object of this invention to provide an apparatus for wrapping glasses and the like by the provision of a dispenser for rolls of film in sheet form mounted upon a base with a means for positioning a glass in such a fashion that the film can be pulled out over it and then severed and simply wrapped with the film already in place. Through this invention the film can be pulled out over a rest for the web of film and with means provided for centering the glass in a registered position. The film may be provided with a registering target in the middle of the sheet, which aids in registration and separation from the web. In this fashion, guess work is eliminated and a glass, which is wrapped in a standard manner, can be provided.

Through the apparatus of this invention and the method employed in its use, a dispenser can be simply mounted upon a sheet metal base with a positioning means formed upon the base in advance of the dispenser so that the web of material may be drawn over the glass. The apparatus in the form of the invention may be conveniently fabricated from a sheet metal base which supports the dispenser and by an extension in advance of the dispenser, forms a positioning means or rest for the glass by funnel-shaped guide elements so that the glass can be self-centered in a stopped or rest position. The apparatus is further provided with a space underneath the dispenser which may be used for storing additional glasses for use in the wrapping operation. The apparatus is simple and inexpensive to manufacture and can be readily used by operators that have no special training.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of example only and that the invention is not limited thereto.

In the drawings:

FIGURE 1 is a top plan view of the film dispensing apparatus for wrapping glasses;

FIGURE 2 is a view in front elevation of the apparatus;

FIGURE 3 is a view in side elevation taken from the left side of FIGURE 1;

FIGURE 4 is an enlarged view in vertical section taken on the line 4—4 of FIGURE 1;

FIGURE 5 is a plan view of a roll of film with the web extended showing a pointed target area on a sheet thereof;

FIGURE 6 is a view in side elevation of a glass with a wrapping film in the preliminary stage in cross section; and FIGURE 7 is a view taken similarly to FIGURE 6 at the completion of the wrapping stage.

Referring now to the drawings, and FIGURES 1 through 4 in particular, the apparatus of this invention is generally designated by the reference numeral 10. It is comprised of a flat base 12, which may be of sheet metal or other convenient material construction such as plastic. A dispenser, generally indicated by the reference numeral 14, is supported over the base and a glass positioning means, designated by the reference numeral 16, is provided at the front of the base.

The dispenser 14 has a trough member 20 which is comprised of a rear wall 22 and a front wall 24 with the latter wall serving as a rest for the web of sheet material as it is withdrawn. The trough 20 is supported upon a pair of longitudinally-extending support members 26. The support members are connected to inwardly-turned support flanges 28 which are formed as extensions above the base for connection to a vertical wall 30 at each side of the base.

The dispenser is provided with a piercing means, generally identified by reference numeral 32, which is formed by converging front edges 34 and 36 of the front wall of the trough which forms a point that provides a piercing means. This piercing means is further augmented by a film finding member which is comprised of two flanges 38 and 40 connected to the front wall and forming extensions thereof. The forward edges of the flanges 38 and 40 fall in a vertical plane which aids in the piercing or separating operation of the film as will be further described.

The positioning means 16 is formed as a front extension of the base 12 to provide a work surface 42 upon which the glass is positioned when it is wrapped. Vertical flanges 44 and 46 at either side of the triangular or funnel-shaped work surface further defines the positioning means. The flanges act as rails or guides so that the glass automatically is funneled into the position shown in dotted lines and designated by the reference numeral 47 in FIGURE 1.

The apparatus of this invention is very simply employed. In use, a roll of plastic wrapping film 50 is placed in the trough as shown in dotted lines in FIGURE 3. This film is provided with a plurality of sheets 51 which are defined by conventional transfer scoring lines so that as the film is unrolled in the direction of the arrows shown in FIGURE 3, the sheets may be torn off periodically. The film employed may be in the fashion of the roll 50 shown in FIGURE 5 provided with transfer scoring lines 52. The film is further provided desirably with a printed target area 54 which may be in the nature of advertising or an attractive design or the like. It will also be understood that the target area may be either centered or in a certain selected fashion so that the operator can recognize the positioned target area, which is uniform on each of the sheets and register the film in the proper fashion as it is withdrawn and separated from the dispenser.

In use, a glass is simply placed in the working position shown in FIGURE 1 in dotted lines by the reference numeral 47. This position is automatically centered by the flanges 44 and 46 so that the glass is in the desired position by merely moving it to the top or limited position defined by the funnel-shaped positioning means. The operator then withdraws the web of material shown by the dotted line in FIGURE 3 and moves it to a position shown in the horizonital dotted line in FIGURE 4 and identified by the reference numeral 56.

After the web of material has been withdrawn to the horizontal position shown at 56, the transfer score line defining the rear of the sheet is so designed as to fall in the position shown in the arrow 58. The sheet of material is then lowered to the position in full lines and identified by the reference numeral 60 in FIGURE 4. In the withdrawal operation, the target area 54 will be slightly in advance of the glass when the sheet is withdrawn in horizontal position so the operator can recognize a desired position of withdrawal and stop the withdrawing operation. The operator then perforates the film along the transfer scoring line 52 by pressing the film with a finger at the arrow position 58. The piercing means with the flange rest member places the greatest amount of tension at this point and the sheet then is simply perforated with tearing along the perforation lines. The sheet of film may also be perforated by withdrawing the web to the point where the transverse scoring line is over the piercing means 32 and then performing the separation operation in the fashion described. The film, after separation, drapes over the glass in the fashion shown in FIGURE 6 and is wrapped around the glass to the condition shown in FIGURE 7 by merely pressing down on the film which, due to the cling-like nature of construction, firmly wraps the glass to provide a sanitary package.

Various changes and modifications may be made within this invention as will be readily understood by those skilled in the art. Thus instead of wrapping glasses, it will be readily understood that other objects may be also wrapped through the apparatus of this invention. Such modifications and changes are within the scope and teaching of this invention as defined by the claim appended hereto.

What is claimed is:

1. Apparatus for dispensing sheets for wrapping glasses and the like, said apparatus comprising a flat base, a dispenser supported upon said base and having a trough receiving a roll of wrapping material in web form, said trough being provided with a front wall member providing a rest for the web as it is unrolled, piercing means for the web comprised of converging front edges on a front wall of the trough defining a point over which the web is pulled and positioning means on said base receiving a glass in a centered position under the web as it is pulled out from the rest means, said positioning means being comprised of converging guide elements on the base to provide for self-centering of the glass as it is moved along the base into the positioning means, and said guide elements being upstanding vertical flanges at the end of a forward portion of the base, said dispenser trough being supported above the base in spaced relation thereto to provide a storage and work space on the base underneath the dispenser trough, said trough being supported upon inwardly extending flanges connected to a pair of side walls extending above said base, and said roll of wrapping material being provided with indicia at standard intervals on the web which provides a means for registering the end of the web upon the glass to be wrapped as the web is pulled out from the dispenser.

References Cited

UNITED STATES PATENTS

| 2,540,090 | 2/1951 | Brackney | 53—219 X |
| 2,936,560 | 5/1960 | Gentry | 53—219 |
| 3,016,673 | 1/1962 | Parker | 53—390 |
| 3,045,883 | 7/1962 | Andrews | 225—90 |
| 3,091,904 | 6/1963 | Howe | 53—219 X |
| 3,299,612 | 1/1967 | Bernhardt | 53—219 X |

WAYNE A. MORSE, Jr., Primary Examiner

U.S. Cl. X.R.

53—390; 93—58; 225—90